Oct. 24, 1933.   C. KRAUCH ET AL   1,932,365
REFINING OF CRUDE BENZOL
Filed March 9, 1931
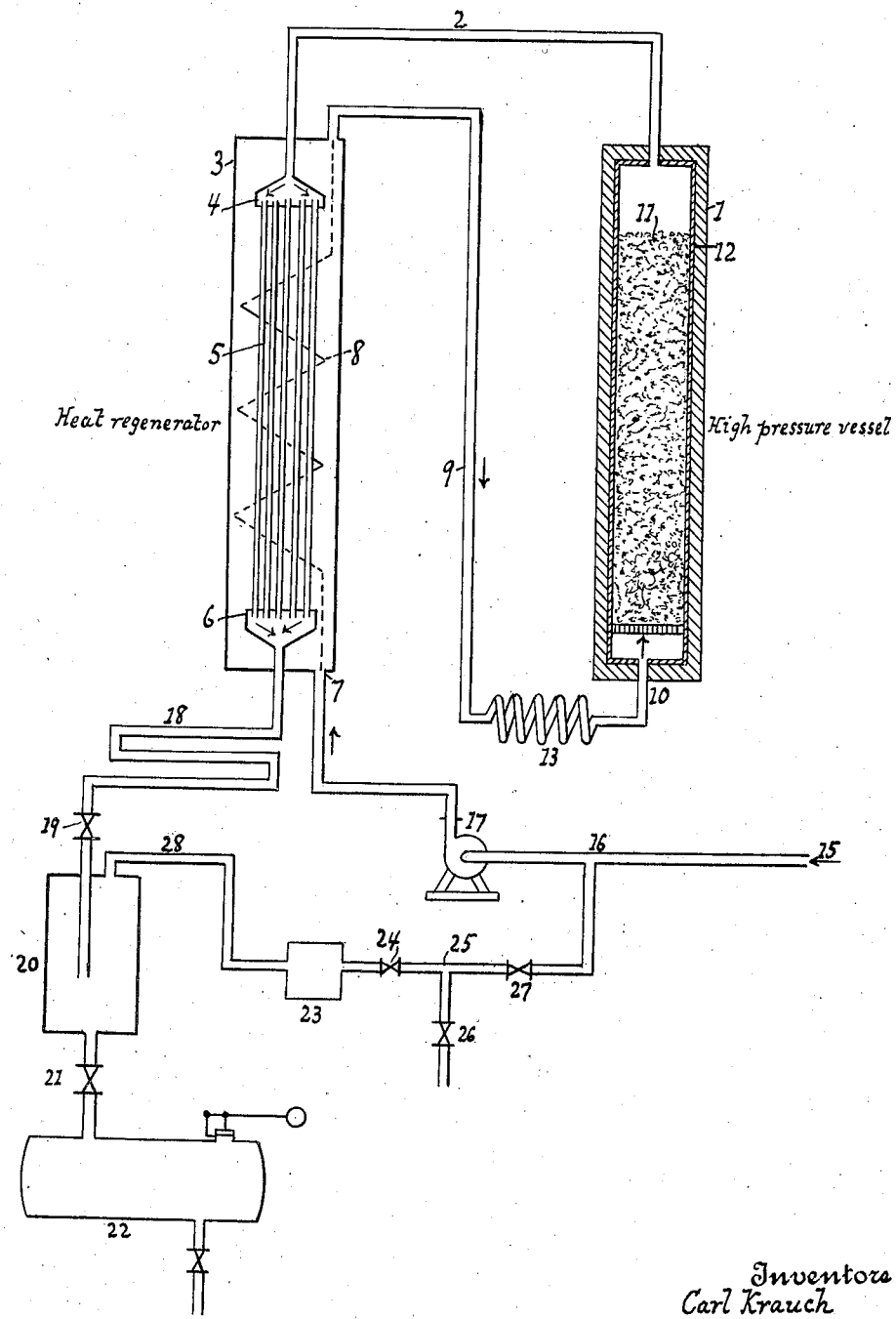
Inventors
Carl Krauch
Mathias Pier
By their Attorneys
Hauff & Warland Patented Oct. 24, 1933

1,932,365

UNITED STATES PATENT OFFICE 1,932,365

REFINING OF CRUDE BENZOL

Carl Krauch, Ludwigshafen-on-the-Rhine, and Mathias Pier, Heidelberg, Germany, assignors to I. G. Farbenindustrie Aktiengesellschaft, Frankfort-on-the-Main, Germany Application March 9, 1931, Serial No. 521,252, and in Germany September 15, 1925

10 Claims. (Cl. 260—168)

This application is a continuation-in-part of the application for Letters Patent, Ser. No. 135,295, filed September 13th, 1926.

The present invention relates to the refining of crude benzol.

Hitherto the crude benzol obtained, for example, from coal tar or by washing gases containing benzol with a suitable wash oil and subsequent distillation has been purified by treatment with acids and alkalies. In this process, however, considerable losses of benzol by the formation of emulsions and resins cannot be avoided.

We have now found that crude benzol can be converted into a pure product of neutral reaction free from unsaturated compounds and devoid of or very low in sulphur compounds by treating it with hydrogen or gases containing or giving rise to hydrogen in the presence of a catalyst, suitable for destructive hydrogenation and immune from poisoning by sulphur, at a temperature of between about 180° and 500° C. under a pressure of at least 10 atmospheres.

The process may be carried out with advantage at pressures of between 20 and 100 atmospheres, for example at about 40 atmospheres, although where apparatus is available capable of resisting very high pressures, more elevated pressures, for example of about 150, 200 or more atmospheres may be employed.

Catalysts comprising a metal of the sixth group of the periodic system, such as chromium, tungsten or molybdenum, as such or in the form of its compounds, and in particular in the form of its oxides, are especially suitable. The activity of the said catalysts may be adjusted by an admixture of other oxides, as for example oxides of metals of group 2 of the periodic system, as for example of magnesium oxide or zinc oxide. The proportions of the various constituents of the catalyst may be varied by one skilled in the art within reasonable limits. Thus, a catalyst may be employed consisting almost completely of molybdic acid and on the other hand the catalyst may contain only 10 per cent of molybdic acid and 90 per cent of magnesium oxide. However, with very low proportions of molybdic acid the catalyst will usually not be as effective as with higher proportions of molybdic acid. The most effective catalyst will usually contain the molybdic acid and magnesium oxide in about molecular proportions.

It is essential that no substantial conversion of the benzol to be refined takes place and this will usually be the case under the aforesaid conditions. To ensure this a temperature of below 460° C. is preferably maintained. The hydrogen pressure should always be maintained lower than that at which a substantial hydrogenation of the benzol would occur at the temperature and with the catalysts employed. The reaction may be controlled by observation of the reaction products. Thus, when a decrease in the content of benzol in the reaction products is observed, the temperature should be reduced or the pressure should be reduced, or the rate of flow of the materials undergoing treatment increased (when operating continuously) or any of these measures may be combined.

The duration of the refining varies considerably, as might be supposed, depending on the nature of the raw material, the activity of the catalyst, temperature, pressure and the like. Generally speaking, with batch operations the total time may be from two to ten hours or more, depending on the yield desired, while with continuous operations the time is usually shorter. When treating the benzol in the vaporous phase as will usually be the case in the process according to the present invention, the feed rate may be 0.4, 1 or 1½ volumes per hour per volume of reaction space under the prevailing conditions of temperature and pressure. The volume of hydrogen may likewise vary considerably and should always, of course, be in excess of that actually required for the refining; for example, the rate of flow of hydrogen may be in excess of about 600 litres per kilogram of crude benzol.

By this process a liquid is obtained from which by distillation pure benzol besides other valuable hydrocarbons of low boiling point is obtained. A conversion of benzol into other compounds does not take place to any substantial degree.

An apparatus suitable for carrying out the process according to the present invention is illustrated diagrammatically in elevation and partly in section in the accompanying drawing, though it should be understood that the invention is not limited to refining carried out in the specific form of apparatus illustrated.

A mixture of crude benzol and hydrogen is introduced into the plant at 15 and is compressed to the necessary pressure by means of the compressor 17. Preferably the pressure should be about 40 atmospheres. The mixture then passes at 7 into the heat regenerator 3 and is passed around the pipes 5 in the manner indicated by the dotted line 8. The mixture thus preheated is then passed by way of the pipe 9 to the heating coil 13 in which it attains the temperature requisite for the reaction, for example a temperature of about 350° C. Then the mixture is passed at 10 into the high pressure reaction vessel 1 provided with the lining 12 of highly alloyed chromium steel. The said reaction vessel is filled with a catalyst, immune from poisoning by sulphur, as for example a catalyst prepared from molybdic acid and magnesium oxide. The rate of flow is adjusted so that substantially no decomposition of benzol takes place, for example the rate of flow may be adjusted at 0.5 litre of vaporized benzene per hour per litre of reaction space. The refined mixture passes off from the reaction vessel by way of the pipe 2 into the heat regenerator 3. The products are passed though the header 4 into the tubes 5 and thence into the header 6. Thereupon they are passed through the condenser 18 and the pressure release valve 19 into the stripping vessel 20. The liquid products are drawn off through the valve 21 into the collecting vessel 22. The gases are passed off from the said stripping vessel to the pipe 28 and hydrogen sulphide and other impurities are removed therefrom in the purification plant 23. They are then either recycled by way of valves 24 and 27 to the branch point 16, or drawn off at 25 through valve 26.

The following examples will further illustrate, how our invention may be carried out in practice, but the invention is not limited to these examples.

*Example 1*

A crude benzol obtained by subjecting a wash oil saturated with benzol to steam distillation is passed in a high pressure vessel consisting of chromium-nickel steel with a mixture of hydrogen and nitrogen at 450° C. and under a pressure of between 150 and 200 atmospheres over a catalyst prepared by subjecting a mixture of molybdic acid and magnesium oxide to pressure. The resulting hydrogenated product can be separated by distillation into pure benzol and a mixture of valuable other hydrocarbons of low boiling point.

*Example 2*

Dark coloured crude benzol containing thiophene is passed in a current of hydrogen at about 460° C. and under a pressure of 200 atmospheres over a catalyst prepared by subjecting a mixture of molybdic acid and zinc oxide to pressure, and which is arranged in a high pressure vessel lined inside with aluminium. A light coloured product which is free from unsaturated compounds and thiophene, is obtained, from which by distillation pure benzol can be obtained besides a small amount of other valuable hydrocarbons of low boiling point.

In the same manner commercial benzol containing thiophene can be completely freed from thiophene.

*Example 3*

Crude benzol obtained by scrubbing of coke oven gases and which can be refined with sulphuric acid only with great losses is passed together with hydrogen under a pressure of about 40 atmospheres and at a temperature of about 350° C. over a catalyst prepared by pressing 80 parts of molybdic acid together with 20 parts of magnesium oxide. A water-white product is thus obtained which is free from sulphur, unsaturated compounds and substances liable to resinification. No hydrogenation of the aromatic hydrocarbon takes place. In the said example about 0.5 litre of the crude benzol vapour are treated hourly per litre of reaction space.

If in the said example atmospheric pressure were employed under otherwise like conditions only a negligible refining action would be observed and it would be necessary subsequently to refine the product with sulphuric acid.

What we claim is:—

1. The process of purifying crude benzol which comprises treating the same with a gas comprising free hydrogen at a temperature between 180° and 500° C. and under a pressure of at least 10 atmospheres in the presence of a catalytic substance selected from the group consisting of metals of the sixth group of the periodic system and difficultly reducible metal oxides immune from poisoning by sulphur, the pressure employed being below that capable of effecting hydrogenation of the benzol at the temperature and with the catalyst employed.

2. The process of purifying crude benzol derived from coal tar which comprises treating the same with a gas comprising hydrogen at a temperature between 180° and 500° C. and under a pressure of at least 10 atmospheres in the presence of a catalytic substance selected from the group consisting of metals of the sixth group of the periodic system and difficultly reducible metal oxides immune from poisoning by sulphur, the pressure employed being below that capable of effecting hydrogenation of the benzol at the temperature and with the catalyst employed.

3. The process of purifying crude benzol which comprises treating the same with a gas comprising free hydrogen at a temperature between 180° and 460° C. and under a pressure of at least 10 atmospheres in the presence of a catalytic substance selected from the group consisting of metals of the sixth group of the periodic system and difficultly reducible metal oxides immune from posioning by sulphur, the pressure employed being below that capable of effecting hydrogenation of the benzol at the temperature and with the catalyst employed.

4. The process of purifying crude benzol which comprises treating the same with a gas comprising free hydrogen at a temperature between 180° and 500° C. and under a pressure of at least 10 atmospheres in the presence of a catalytic substance selected from the group consisting of metals of the sixth group of the periodic system and their oxides the pressure employed being below that capable of effecting hydrogenation of the benzol at the temperature and with the catalyst employed.

5. The process of purifying crude benzol which comprises treating the same with a gas comprising free hydrogen at a temperature between 180° and 460° C. and under a pressure of at least 10 atmospheres in the presence of a catalytic substance selected from the group consisting of metals of the sixth group of the periodic system and their oxides, the pressure employed being below that capable of effecting hydrogenation of the benzol at the temperature and with the catalyst employed.

6. The process of purifying crude benzol which comprises treating the same with a gas comprising free hydrogen at a temperature between 180° and 500° C. and under a pressure of at least 10 atmospheres in the presence of a catalyst comprising essentially molybdenum, the pressure employed being below that necessary to effect hydrogenation of the benzol at the temperature and with the catalyst employed.

7. The process of purifying crude benzol which comprises treating the same with a gas comprising free hydrogen at a temperature between 350° and 460° C. and under a pressure between 40 and 200 atmospheres in the presence of a catalyst comprising essentially molybdenum.

8. The process of purifying crude benzol which comprises treating the same with a gas comprising free hydrogen at a temperature between 350° and 460° C. and under a pressure between 40 and 200 atmospheres in the presence of a catalyst comprising essentially molybdenum and a difficultly reducible oxide immune from poisoning by sulphur.

9. The process of purifying crude benzol which comprises treating the same with a gas comprising free hydrogen at a temperature between 350° and 460° C. and under a pressure between 40 and 200 atmospheres in the presence of a catalyst comprising essentially molybdenum and a difficultly reducible oxide of a metal of the second group of the periodic system.

10. The process of purifying crude benzol, which comprises passing a mixture of crude benzol together with hydrogen under a pressure of about 40 atmospheres and at about 350° C. over a catalyst prepared from 80 parts of molybdic acid and 20 parts of magnesium oxide.

CARL KRAUCH.
MATHIAS PIER.